United States Patent
Chen et al.

(10) Patent No.: US 7,603,140 B2
(45) Date of Patent: Oct. 13, 2009

(54) METHOD OF PHASE SWEEP TRANSMIT DIVERSITY (PSTD) AND APPARATUS FOR PROVIDING PSTD

(75) Inventors: Tai-Ann Chen, Livingston, NJ (US);
Martin H. Meyers, Montclair, NJ (US);
Susan Wu Sanders, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 489 days.

(21) Appl. No.: 11/130,165

(22) Filed: May 17, 2005

(65) Prior Publication Data

US 2006/0264183 A1  Nov. 23, 2006

(51) Int. Cl.
*H04M 1/00*  (2006.01)

(52) U.S. Cl. .................. 455/562.1; 455/550.1; 370/339; 375/267

(58) Field of Classification Search ............. 455/550.1, 455/561, 562.1; 370/339; 375/267, 347
See application file for complete search history.

(56) References Cited

U.S. PATENT DOCUMENTS

| | | | | |
|---|---|---|---|---|
| 5,999,128 | A * | 12/1999 | Stephens et al. | 342/375 |
| 6,078,571 | A * | 6/2000 | Hall | 370/331 |
| 6,330,458 | B1 * | 12/2001 | Lamoureux et al. | 455/561 |
| 6,591,100 | B1 * | 7/2003 | Dent | 455/434 |
| 7,042,955 | B2 * | 5/2006 | Benning et al. | 375/267 |
| 7,215,956 | B2 * | 5/2007 | Liu et al. | 455/434 |
| 7,477,920 | B2 * | 1/2009 | Scheinert et al. | 455/561 |
| 2003/0021352 | A1 * | 1/2003 | Benning et al. | 375/267 |
| 2003/0022635 | A1 * | 1/2003 | Benning et al. | 455/101 |
| 2004/0110506 | A1 * | 6/2004 | Dent | 455/437 |

* cited by examiner

*Primary Examiner*—Nhan T Le

(57) ABSTRACT

In the method, a phase of at least one signal transmitted from a transmit antenna of a base station is shifted based on a sweeping frequency having a differentiating component.

9 Claims, 2 Drawing Sheets

METHOD OF PHASE SWEEP TRANSMIT DIVERSITY (PSTD) AND APPARATUS FOR PROVIDING PSTD

BACKGROUND OF THE INVENTION

1. Field of the Invention

The present invention relates to wireless communication systems, and more particularly, to a method and a base station for providing phase-sweep transmit diversity (PSTD) in a wireless communication system.

2. Description of Related Art

A wireless communication system is a complex network of systems and elements. Typically elements include (1) a radio link to a mobile station (e.g., cellular telephone, PDAs, computers, etc.), which is usually provided by at least one and typically several base stations, (2) communication links among base stations, (3) a controller, typically one or more base station controllers or centralized base station controllers (BSC/CBSC), to control communication and to manage the operation and interaction of the base stations, (4) a controller (e.g., mobile switching center (MSC)) or switch, for routing calls and/or data within the system, and (5) a link to the land line or public switch telephone network (PSTN).

One aspect of designing a wireless communication system is to improve the performance of forward link or downlink transmissions. That is, the voice and packet data transmissions from a base station to a mobile station. However, multipath fading may cause multiple copies of the transmissions to be received at the mobile station with time-varying attenuation, phase shift and delay because of multiple reflections on the path.

One technique to mitigate the effects of multipath fading in a wireless communication channel is error correcting codes. Combined with a bit interleaving scheme, an error correction code can reduce bit errors caused by multipath fading. In particular, bit interleaving scatters the bit errors among the uncorrupted bits (i.e., "good" bits) so that the error correction codes can better correct the error bits. However, the fading process must be fast enough so that a burst of bit errors is much shorter than the bit interleaving period (i.e., a frame) for bit interleaving to be effective. For example, a slow moving mobile station (e.g., a mobile station used by a pedestrian or an in-building user) creates a slow fading process such that fading bursts on the wireless communication channel are longer than a frame. As a result, the error correction code may not always compensate for the error bits.

Diversity is another technique used to reduce the effect of multipath fading. In particular, multiple antennas at the reception end, e.g., the mobile station, may be used to combine, select and/or switch between multipaths to improve the quality of the transmission from the transmission end, e.g., the base station. Forward link or downlink performance may be further improved by implementing diversity on the transmission end. In particular, phase-sweep transmit diversity (PSTD) may be implemented to reduce multipath fading effects. To provide PSTD, a base station generally includes a signal source, a frequency-shift element, a transmitting unit, and two or more transmitting antennas. A basic flow for providing PSTD may start with the signal source providing a baseband signal to a frequency-shift element. The frequency-shift element imposes time-varying phase shifts (equivalent to frequency shift) on the baseband signal and produces multiple signal streams where each signal stream corresponds to each transmitting antenna. The transmitting unit then modulates the frequency-shifted signals to produce radio frequency (RF) signals and amplifies the RF signals with power amplifiers. Each individual RF signal is then transmitted on each antenna. Typically, the time-varying phases imposed on antennas are symmetric. For an example of a two-antenna system, if $\Phi(t)$ is imposed on the first antenna at time t, $-\Phi(t)$ will be imposed on the second antenna at time t. The overall phase difference between the two antennas will be $2\Phi(t)$ in this example. Furthermore, the antenna separation determines the transmission characteristic. If the antenna separation is large, the communication paths between each antenna and the receiver unit are more likely to be independent, and the antennas exhibit diversity characteristic. If the antenna separation is small, the transmitted signal forms energy-concentrated beams, which may sweep across the sector if time-varying phases are imposed on the antennas.

As will be appreciated, in PSTD the phase difference between the base station transmit antennas changes periodically. This period is referred to as the sweeping frequency. When base stations in the wireless network apply the same sweeping frequency (or integer multiples of a same sweeping frequency), the desired signal and interference may sweep at the same frequency (or integer multiple thereof). This may lower the signal-to-interference plus noise ratio (SINR) in some areas, and these areas may always stay in the low SINR condition as the desired and interference beams always sweep to these areas at the same time when sweeping frequencies are the same among neighboring sectors. For high speed data systems (e.g., CDMA2000 EVDO systems), a low SINR may mean low data throughput. For a voice system (e.g., a CDMA voice system), low SINR may cause increases in base station transmit power and this can reduce system capacity.

SUMMARY OF THE INVENTION

In at least one embodiment of the method of phase sweep transmit diversity according to the present invention, the variation rate of the imposed time-varying phase (e.g., sweeping frequency) among transmit antennas of a base station is set to differ from sweeping frequencies employed by, for example, neighboring base stations such that the sweeping frequency is not an integer multiple of one of the sweeping frequencies employed by at least the neighboring base stations.

For example, in one embodiment the sweeping frequency is based on a differentiating component. In one embodiment, the differentiating component is a randomly generated frequency offset. For example, the sweeping frequency equals a base sweeping frequency plus the randomly generated frequency offset. In another embodiment, the differentiating component is based on a parameter differentiating one base station from another. For example, the parameter may be the PN offset of the base station. Here, the sweeping frequency may equal a base sweeping frequency plus the differentiating component.

In a further embodiment, the phase of a first signal transmitted on a first antenna of the base station is swept based on the sweeping frequency having the differentiating component and the phase of a second signal transmitted on a second antenna of the base station is swept based on the sweeping frequency having the differentiating component.

In at least one embodiment of the method of phase sweep transmit diversity according to the present invention, a phase of at least one signal transmitted from a transmit antenna of a base station is swept based on a sweeping frequency that randomly differs from sweeping frequencies employed by other base stations.

Another embodiment of the present invention includes a base station employing phase sweep transmit diversity. The base station includes a phase shifter sweeping a phase of at least one signal based on a sweeping frequency that differs from sweeping frequencies employed by other base stations such that the sweeping frequency is not an integer multiple of one of the sweeping frequencies employed by other base stations. The base station further includes an antenna transmitting the signal output from the phase shifter.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF EXAMPLE EMBODIMENTS

Figure 1:
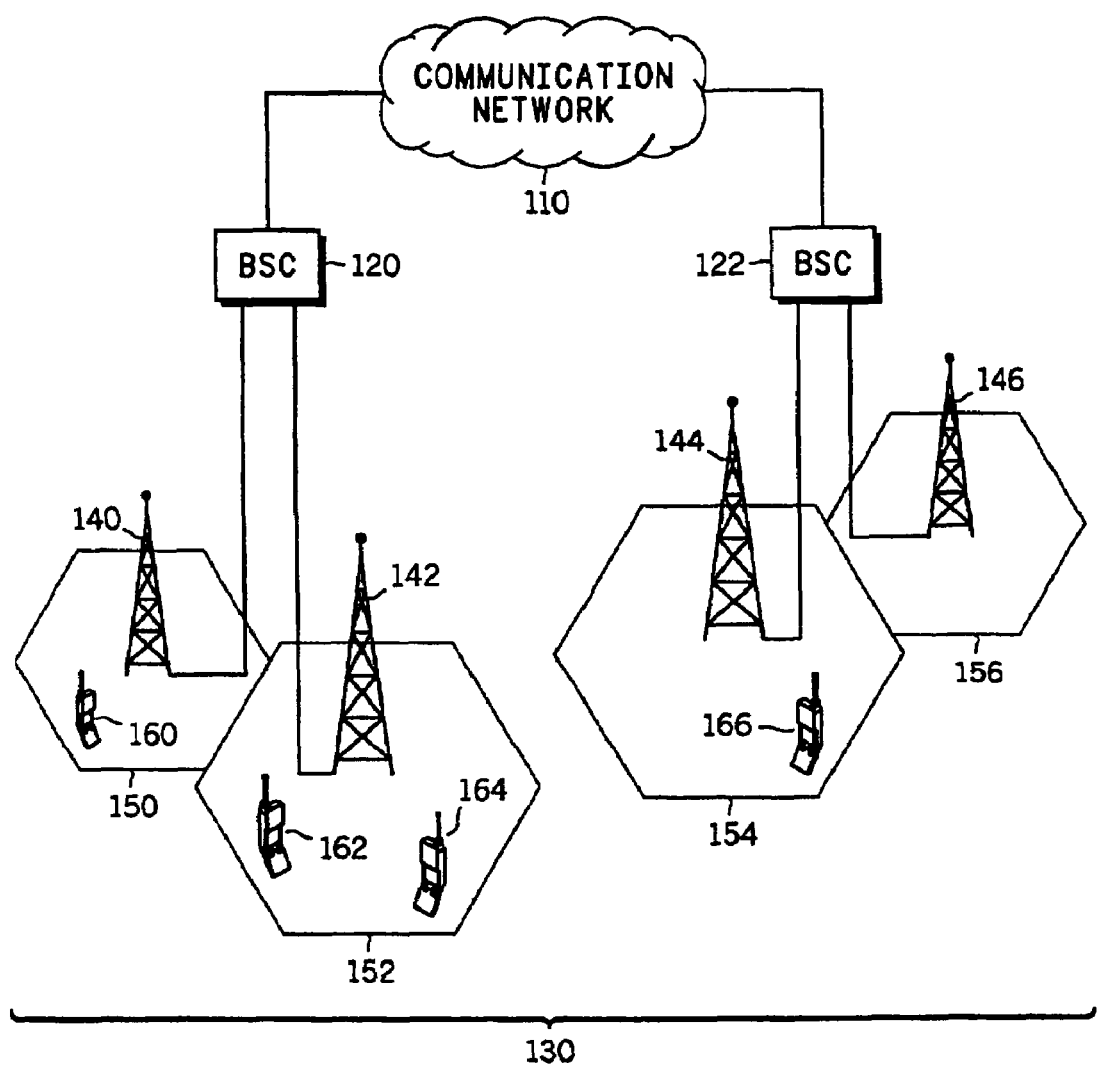
FIG. 1 is a block diagram representation of a wireless communication system according to an example embodiment of the present invention.

Example embodiments of a method and a base station for providing phase-sweep transmit diversity in a wireless communication system are described. The wireless communication system provides communication services to a plurality of mobile stations. In particular, a base station provides phase-sweep transmit diversity by phase-shift modulating a first signal S1 based on a first control signal to produce a first phase-shift modulated signal $S1*\exp(-j\Phi_1(t))$ and by phase-shift modulating a second signal S2 based on a second control signal to produce a second phase-shift modulated signal $S2*\exp(-j\Phi_2(t))$. The base station transmits the first phase-shift modulated signal via a first antenna and the second phase-shift modulated signal via a second antenna to the plurality of mobile stations.

In one embodiment of the present invention, a phase sweep $\Phi(t)$ is defined as:

$$\Phi(t) = \Phi_2(t) - \Phi_1(t). \qquad (1)$$

Therefore, $\Phi(t)$ indicates the time-varying phase sweep applied to both the first and second antennas. The phase sweep $\Phi(t)$ may be expressed as:

$$\Phi(t) = 2\pi f_{PDST} t \qquad (2)$$

where $f_{PSTD}$ is the sweeping frequency. The first phase shift $\Phi_1(t)$ may then be set equal to $0.5\Phi(t)$ and the second phase shift $\Phi_2(t)$ may be set equal to $-0.5\Phi(t)$.

According to one embodiment of the present invention, the sweeping frequency is based at least in part on a differentiating component. For example, in one embodiment, the sweeping frequency $(f_{PSTD})_i$ for an ith base station may determined as:

$$(f_{PSTD})_i = (f_{PSTD})_{base} + (f_{random})_i \qquad (3)$$

where $(f_{PSTD})_{base}$ is a base or primary sweeping frequency such as used conventionally, and $(f_{random})_i$ is a randomly generated sweeping frequency uniformly distributed in $(0, f_{max})$. Here, $f_{max}$ is a maximum possible offset. As will be appreciated, the present invention is not limited to a uniformly distributed function.

As another example, the differentiating component may be based on a parameter differentiating one base station from another. For example, an additional frequency offset $f_{offset}$ may be determined as a function of the PN offset for a base station. For example, the sweeping frequency offset may be calculated as:

$$(f_{offset})_i = f_{max} * \{\mod[(PN\text{offset})_i, 64] + 1\}/64 \qquad (4)$$

where $f_{max}$ is a parameter that defines the maximum sweeping frequency offset and $\mod[.]$ is a function that calculates the remainder of the division of its arguments. The sweeping frequency for the ith base station in this embodiment may be expressed as:

$$(f_{PSTD})_i = (f_{PSTD})_{base} + (f_{offset})_i \qquad (5)$$

These above described embodiments add a differentiating component to a base or primary frequency component to produce a sweep frequency for the base station that differs from the sweep frequencies of other base stations and differs from integer multiples of the sweep frequencies of the other base stations. As a result, the variation pattern of signal-to-interference plus noise ratio (SINR) may be improved.

In the simplest implementation, an embodiment of the present invention is selectively implemented at base stations such that neighboring sectors do not use the same sweeping frequency. This permits sweeping frequency reuse for non-neighboring base stations. In a more complex implementation, an embodiment or differing embodiments are employed throughout the communication network such that each sector of a base station has a sweeping frequency that differs from that of another sector. Also, an implementation of intermediate complexity would involve selective implementation that increases the distance between base stations before permitting sweeping frequency reuse as compared to the simplest implementation discussed above.

While the embodiments of the present invention have been described as implementing the differentiating component in an additive nature, it will be appreciated that the differentiating component may be impressed on the sweeping frequency in many different ways such as by multiplication, as an input to a function for deriving the sweeping frequency, etc.

A communication system in accordance with the present invention is described in terms of several example embodiments, and particularly, in terms of a wireless communication system operating in accordance with at least one of several standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the IS-55 Time Division Multiple Access (TDMA) digital cellular, the IS-95 Code Division Multiple Access (CDMA) digital cellular, CDMA 2000, the Personal Communications System (PCS), 3G, 4G and variations and evolutions of these protocols. As shown in FIG. 1, a wireless communication system 100 includes a communication network 110, a plurality of base station controllers (BSC), generally shown as 120 and 122, servicing a total service area 130. The wireless communication system 100 may be, but is not limited to, a frequency division multiple access (FDMA) based communication system, a time division multiple access (TDMA) based communication system, and code division multiple access (CDMA) based communication system. As is known for such systems, each BSC 120 and 122 has associated therewith a plurality of base stations (BS), generally shown as 140, 142, 144, and 146, servicing communication cells, generally shown as 150, 152, 154, and 156, within the total service area 130. The BSCs 120 and 122, and base stations 140, 142, 144, and 146 are specified and operate in accordance with the applicable standard or standards for providing wireless communication services to mobile stations (MS), generally shown as 160, 162, 164, and 166, operating in communication cells 150, 152, 154, and 156.

Figure 2:
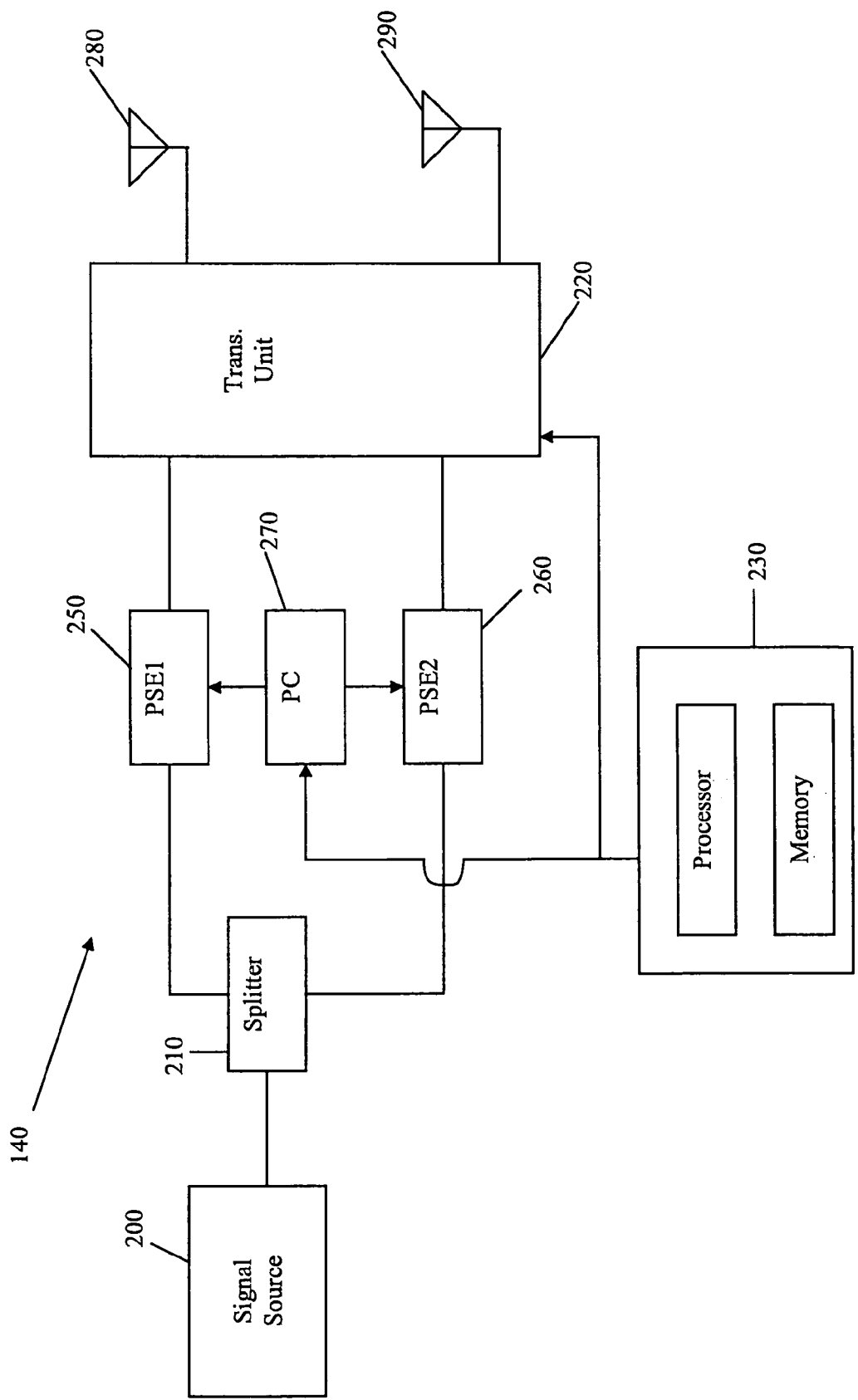
FIG. 2 is a block diagram representation of a base station according to an example embodiment of the present invention.

Referring to FIG. 2, the base station 140 generally includes a signal source 200, a splitter 210, a controller 230, a first phase-shift element (PSE1) 250, a second phase-shift element (PSE2) 260, a phase controller (PC) 270, a first antenna 280, a second antenna 290, and a transmitting unit 220. The signal source 200 generates a signal, which the splitter 210 splits into the first signal S1 and the second signal S2 such as described above. Under the control of the phase controller 270, the first phase shift element 250 imposes a first time-varying phase shift on the first signal S1 and the second phase shift element 260 imposes a second time-varying phase shift on the second signal S2. Under the control of the controller 230, the phase controller 270 generates a sweeping frequency according to one of the above described embodiments, and determines the first time-varying phase shift and the second time-varying phase shift for the first and second signals, respectively, based on the determined sweeping frequency as discussed in one of the above described embodiments. The phase controller 270 then generates and sends first and second control signals to the first and second phase-shift elements 250 and 260 so that the first and second phase-shift elements impart the respectively determined time-varying phase shifts.

The first and second control signals may be processed on baseband signals, which are usually handled in an Application-Specific Integrated Circuit (ASIC) or a Digital Signal Processor (DSP), and are hence time-synchronized. Once a sweeping frequency is specified, the phase sweeping pattern may be controlled with high accuracy.

The transmitting unit 220 under the control of the controller 230 modulates the first and second signals to produce radio frequency (RF) signals, and amplifies the RF signals with, for example, power amplifiers. To provide phase-shift transmit diversity, the base station 140 transmits the modulated and phase-shifted first signal via the first antenna 280 and transmits the modulated and phase-shifted second signal via the second antenna 290. The first and second phase modulated signals may span over more than one carrier. As a result, a mobile station may receive the first and second phase-shift modulated signals on a first carrier whereas another mobile station may receive the first and second phase-shift modulated signals on a second carrier from a common base station (e.g., base station 140) such that the first and second phase-shift modulated signals on the first and second carriers are diverse relative to each other.

The controller 230 includes, but is not limited to, a processor 232 and a memory 234. The processor 232 is operatively coupled to the memory 234, which stores a program or a set of operating instructions for the processor 232. In particular, the processor 232 executes the program or the set of operating instructions such that the base station 140 operates in accordance with an example embodiment of the invention. The program or the set of operating instructions may be embodied in a computer-readable medium such as, but not limited to, paper, a programmable gate array, application specific integrated circuit, erasable programmable read only memory, read only memory, random access memory, magnetic media, and optical media.

The invention being thus described, it will be obvious that the same may be varied in many ways. Such variations are not to be regarded as a departure from the spirit and scope of the invention, and all such modifications as would be obvious to one skilled in the art are intended to be included within the scope of the invention.

We claim:

1. A base station employing phase sweep transmit diversity, comprising:
   a phase shifter sweeping a phase of at least one signal based on a sweeping frequency that differs from sweeping frequencies employed by at least neighboring base stations such that the sweeping frequency is not an integer multiple of one of the sweeping frequencies employed by the at least neighboring base stations; and
   an antenna transmitting the signal output from the phase shifter,
   wherein the sweeping step sweeps the phase of at least one signal transmitted from a transmit antenna of a base station based on a sweeping frequency having a differentiating component, wherein the differentiating component is one of based on a parameter differentiating one base station from another and a randomly generated frequency and causes the sweeping frequency to randomly differ from sweeping frequencies employed by other base stations.

2. A method of phase sweep transmit diversity, comprising:
   sweeping a phase of at least one signal transmitted from a transmit antenna of a base station based on a sweeping frequency that differs from sweeping frequencies employed by at least neighboring base stations such that the sweeping frequency is not an integer multiple of one of the sweeping frequencies employed by the at least neighboring base stations,
   wherein the sweeping step sweeps the phase of at least one signal transmitted from a transmit antenna of a base station based on a sweeping frequency having a differentiating component,
   wherein the differentiating component is one of a randomly generated frequency and causes the sweeping frequency to randomly differ from sweeping frequencies employed by other base stations.

3. The method of claim 2, wherein the sweeping frequency equals a base sweeping frequency plus the randomly generated frequency.

4. The method of claim 2, wherein the sweeping step sweeps the phase of a first signal transmitted on a first antenna of the base station based on the sweeping frequency having the differentiating component and sweeps the phase of a second signal transmitted on a second antenna of the base station based on the sweeping frequency having the differentiating component.

5. A method of phase sweep transmit diversity, comprising:
   sweeping a phase of at least one signal transmitted from a transmit antenna of a base station based on a sweeping frequency that differs from sweeping frequencies employed by at least neighboring base stations such that the sweeping frequency is not an integer multiple of one of the sweeping frequencies employed by the at least neighboring base stations,
   wherein the sweeping step sweeps the phase of at least one signal transmitted from a transmit antenna of a base station based on a sweeping frequency having a differentiating component, wherein the differentiating component is based on a parameter differentiating one base station from another.

6. The method of claim 1, wherein the parameter is the PN offset of the base station.

7. The method of claim 6, wherein the sweeping frequency equals a base sweeping frequency plus the differentiating component.

8. The method of claim 1, wherein the sweeping frequency equals a base sweeping frequency plus the differentiating component.

9. The method of claim 1, wherein the sweeping step sweeps the phase of a first signal transmitted on a first antenna of the base station based on the sweeping frequency having the differentiating component and sweeps the phase of a second signal transmitted on a second antenna of the base station based on the sweeping frequency having the differentiating component.

* * * * *

UNITED STATES PATENT AND TRADEMARK OFFICE
CERTIFICATE OF CORRECTION

PATENT NO. : 7,603,140 B2 Page 1 of 1
APPLICATION NO. : 11/130165
DATED : October 13, 2009
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1003 days.

Signed and Sealed this

Fifth Day of October, 2010

David J. Kappos
*Director of the United States Patent and Trademark Office*